United States Patent [19]
Durchman et al.

[11] Patent Number: 5,664,004
[45] Date of Patent: Sep. 2, 1997

[54] SUPPORT OF MULTIPLICITY OF RADIO INTERFACES OVER AN INTERFACE BETWEEN A BASE STATION SYSTEM AND A MOBILE SWITCH

[75] Inventors: Elina Durchman, Mukilteo, Wash.; Juho Laatu, Alaskyla; Sanna Mäenpää, Espoo, both of Finland

[73] Assignee: Nokia Telecommunications OY, Espoo, Finland

[21] Appl. No.: 373,942

[22] Filed: Jan. 13, 1995

[51] Int. Cl.[6] .............. H04Q 7/20; H04Q 7/22; H04Q 7/30
[52] U.S. Cl. .............................. 455/466; 370/469
[58] Field of Search ................... 379/58, 59, 60; 455/33.1

[56] References Cited

U.S. PATENT DOCUMENTS

| | | | |
|---|---|---|---|
| 5,506,837 | 4/1996 | Sollner | 379/60 |
| 5,533,019 | 7/1996 | Jayapalan | 379/60 |

OTHER PUBLICATIONS

Mobile Phone News article, "System Manufactures Address Multiple Standards Needs", Phillips.
Business Information, Inc., vol. 11, No. 10. Mar. 1993.

*Primary Examiner*—Dwayne Bost
*Assistant Examiner*—Nay Aung Maung
*Attorney, Agent, or Firm*—Cushman Darby & Cushman IP Group of Pillsbury Madison & Sutro LLP

[57] ABSTRACT

In mobile radio systems, it may be necessary to support multiple radio interfaces within a single mobile radio network. To support these multiple radio interfaces, it may be necessary to support even multiple signalling protocols within a single interface between a base station controller and a mobile switch, when base stations supporting different radio interfaces are connected via a common base station controller to the mobile switch. The mobile switch and the base station controller must be capable of recognizing to which signalling protocol a message transfer in the single interface belongs to. The messages transferred in the single interface are provided with a discrimination parameter which can be used to discriminate between the messages belonging to different radio interfaces and signalling protocols.

11 Claims, 6 Drawing Sheets

BSSMAP/RSMAP

1 | DISCRIMINATION

Distribution Data Unit ————

2 | LENGTH IND L

Length Indicator ————

3 | LAYER 3
⋮
L+2 | MESSAGE

Layer 3 message ————

FIG. 3

DTAP

1 | DISCRIMINATION
2 | DLCI

——— Distribution Data Unit ———

3 | LENGTH IND L

Length Indicator ————

4 | LAYER 3
⋮
L+3 | MESSAGE

Layer 3 message ————

RADIO INTERFACE 1 MESSAGE
D = 1, DTAP MESSAGE
D = 0, BSSMAP MESSAGE

RADIO INTERFACE 2 MESSAGE
D = 1, DTAP MESSAGE
D = 0, BSSMAP MESSAGE

RADIO INTERFACE 3 MESSAGE
D = 1, DTAP MESSAGE
D = 0, BSSMAP MESSAGE

SUPPORT OF MULTIPLICITY OF RADIO INTERFACES OVER AN INTERFACE BETWEEN A BASE STATION SYSTEM AND A MOBILE SWITCH

FIELD OF THE INVENTION

The present invention relates to mobile radio systems, and particularly to a mobile radio system supporting multiple radio interfaces and signalling protocols.

BACKGROUND OF THE INVENTION

The conventional mobile radio systems are typically intended to support a single radio interface between base stations and mobile stations all over the mobile network. Similarly, a single signalling interface supporting the radio interface is employed between a mobile switch and a base station system, i.e. a base station controller and base stations. In future mobile radio systems, however, it may be necessary to support multiple radio interfaces within a single mobile radio network. To support these multiple radio interfaces, it is necessary to support multiple signalling protocols within a single signalling interface between the base station controller and the mobile switch. This is the case, when base stations supporting different air interfaces are connected via a common base station controller to a mobile switch. If these different radio interfaces utilize different signalling protocols, the mobile switch must be capable of recognition to which signalling protocol the received message belongs. This is required in order to facilitate the mobile switch to select the right signalling protocol for further communication between network elements. Naturally, similar separation is needed also for signalling messages from the mobile switch to the base station system.

One example of conventional mobile radio systems is Paneuropean digital mobile radio system GSM (Global System for Mobile Communication). The interface between base station controller and the mobile switch is called A-interface in the GSM system. Interfaces very much similar to the GSM A-interface will, apparently, be standardized for personal communications systems (PCS). It is expected that supporting multiple radio interfaces will be needed also in PCSs.

SUMMARY OF THE INVENTION

It is therefore an object of the present invention to provide a mobile radio system supporting multiple radio interfaces over a single signalling interface between the base station system and the mobile switch.

It is another object of the invention to enhance the GSM specific A-interface to support multiple radio interfaces and their signalling protocols.

In order to support one radio interface the single interface between the base station system and the mobile switch has to include a signalling protocol which contains a number of signalling messages, called herein as a message group. If a single mobile radio system supports only one radio interface, the single signalling interfaces between the base station system and the mobile switch includes only one message group and no separation between message groups is needed. The case is different, when a mobile radio system supports multiple radio interfaces, and the single signalling interface includes several message groups, one group for each radio interface. According to the present invention the messages in a single signalling interface are provided with a discrimination parameter which can be used to separate to which signalling protocol and radio interface the messages belong to. A dedicated discriminator parameter value is allocated for each radio interface. In other words, the discriminator parameter value associated with each message is radio interface specific. For example, when generating messages to be sent to the mobile switch, the base station system allocates an appropriate discrimination parameter value for the message. The discrimination parameter value of the message received from the base station system is then checked by the mobile switch in order to identify the signalling protocol, the radio interface and the message group to which the message belongs. Same mechanism can be used in the signalling from the mobile switch to the base station system.

The GSM based A-interface between the base station controller and the mobile switch comprises an intermediate distribution sublayer located between the transport layer and upper layer carrying signalling messages. The protocol of this sublayer consists of distribution data unit, which includes a discrimination parameter field. Conventionally the distribution sublayer and the discrimination parameter field is used to distribute the messages into DTAP (Direct Transfer Application sub-Part) and BSSMAP (Base Station System Management Application sub-Part) messages defined in the GSM specifications or RSMAP (Radio System Management Application Part) in PCS system. According to the present invention the GSM specific A-interface is enhanced by using one or more of remaining bits in the discrimination parameter field to identify and separate message groups and radio interfaces in mobile radio systems supporting multiple radio interfaces and associated signalling protocols. The inventive use of discrimination parameter field facilitates a flexible protocol structure of the A-interface when multiple radio interfaces are supported. Further evolution of a single message group is feasible without affecting other message groups. Moreover, support for new radio interfaces and new message groups can be added by allocating new DP values. The support of multiple air interfaces over the GSM specific A-interface is not necessarily more complicated than the support of a single radio interface, because an essential part of the messages are same for all radio interfaces, and thus can be managed in a similar way.

BRIEF DESCRIPTION OF THE DRAWINGS

Preferred embodiments of the present invention will now be described in conjunction with the accompanying drawings, in which:

FIG. 3 depicts the user data field of the SCCP unit data message for carrying BSSMAP/RSMAP messages, FIG. 4 depicts a structure of the user data field of the SCCP unit data message for carrying DTAP messages, FIGS. 7, 8 and 9 illustrate discrimination parameter field values allocated for the radio interface 1, the radio interface 2 and the radio interface 3, respectively, in FIG. 6.

DESCRIPTION OF THE PREFERRED EMBODIMENTS

The present invention can be applied in various mobile radio communication systems for providing a single interface between a mobile switch and a base station system supporting two or more radio interfaces. The present invention is especially suitable for enhancing the GSM specific A-interface, or in any other interface substantially similar to the A-interface, to support multiple radio interfaces and their signalling protocols. In the United States is under development a Personal Communication System PCS under standard draft PN-3343. The A-interface in PCS according to PN-3343 will be substantially similar to the GSM specific A-interface. The preferred embodiments of the present invention will be described when applied in the GSM-specific A-interface, PN-3343 A-interface or a similar interface. The present invention is not, however, intended to be restricted to this specific type of interface.

In the following the GSM specific terminology will be used. The main differences between the terminology of the GSM system and the PCS system will be mentioned.

The basic structure and basic operation of the GSM mobile radio system are well known by persons skilled in the art and detailly defined in the specifications of the GSM system. For defined in detail of the GSM system, a reference made to the ETSI GSM specifications and to a book "The GSM System for Mobile Communications", M. Mouly & M. Pautet, Palaiseau, France.

Figure 1:
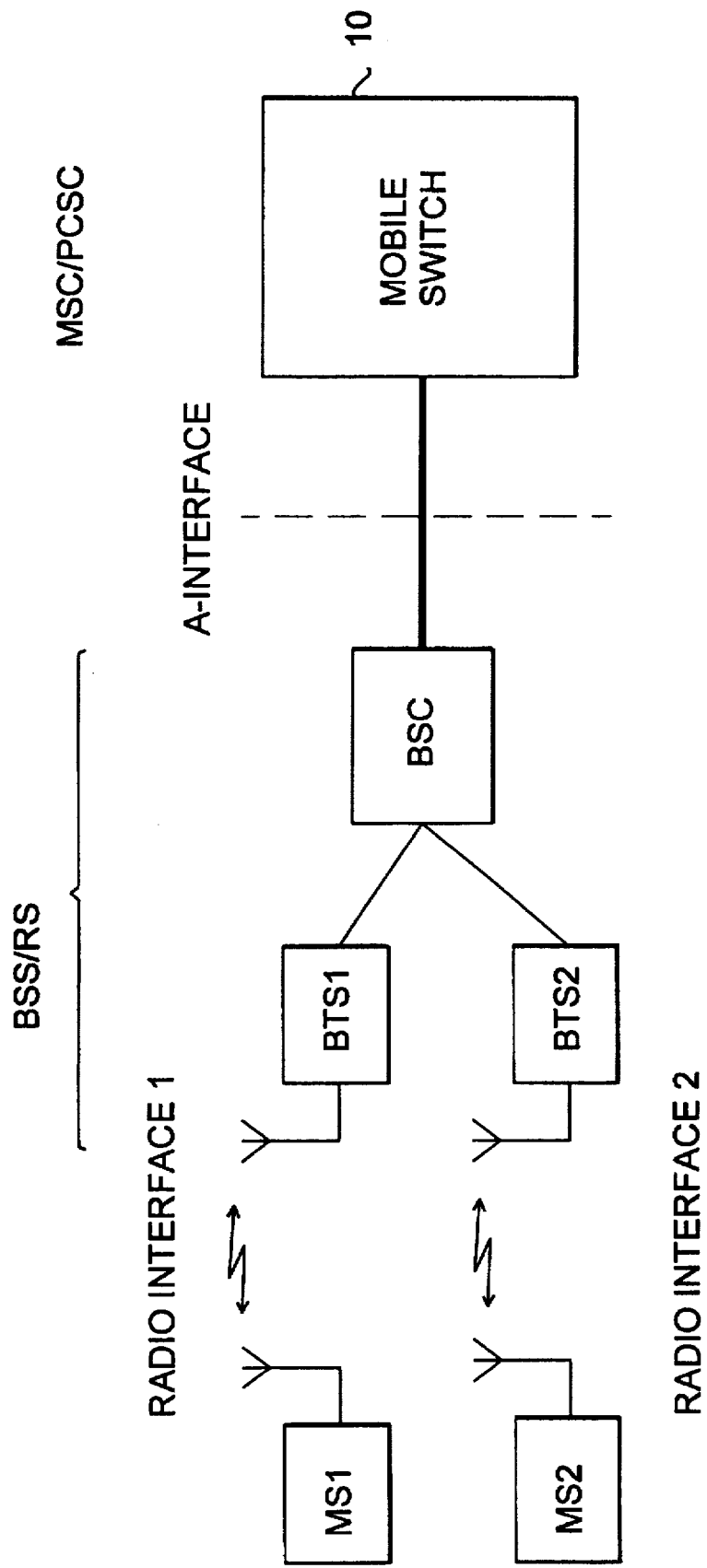
FIG. 1 depicts a mobile radio communication system including a single interface between base station system and the mobile switch and supporting multiple radio interfaces, according to the invention.

A mobile radio system with multiple air interfaces is shown in FIG. 1. A mobile switch 10 (a mobile services switching centre MSC in GSM system, a personal services switching center PCSC in the PCS system) switches incoming and outgoing calls. Its functions are partly similar to those of an exchange in a fixed telephone network. In addition the mobile switch 10 has functions typical to only mobile communications, such as subscriber location management, paging, authentication, etc. Mobile radio stations MS (Personal Station PS in PCS system) are connected to the mobile switch 10 by means of base station systems BSS (a Radio System RS in PCS system). A base station system BSS comprises a base station controller BSC and base stations BTS. A single base station controller BSC is used for controlling a plurality of base stations BTS. In FIG. 1 a base station system BSS is shown in which the BSC is connected to two base stations BTS1 and BTS2. Base stations BTS1 and BTS2 are supporting different radio interfaces 1 and 2, respectively. The type and exact implementation of the radio interface is not essential to the present invention. Examples of different radio interfaces include PCS 1900 air interface, IS-95 based Air interface PN-3384, and PCS2000 Air interface. A first group of mobile stations MS, such as MS1, are capable to communicate using the radio interface 1, and therefore, the base station BTS1. A second group of mobile stations MS, such as mobile station MS2, is capable of communicating using radio interface 2, and therefore, base station BTS2. These base stations BTS1 and BTS2 are connected via a common base station controller BSC to the mobile switch 10. The single interface between the BSC and the mobile switch 10 is a GSM based A-interface or a PCS specific A-interface PN-3343. If the different air interfaces 1 and 2 utilize different signalling protocols, the mobile switch 10 must be capable of recognizing to which signalling protocol the message received via A-interface belongs. This is required in order to facilitate the mobile switch 10 to select the right signalling protocol for further communication between network elements.

In order to implement this, a discrimination parameter field according to the invention is provided and associated with each of the messages transferred over the interface between BSC and the mobile switch 10. In other words the base station controller BSC allocates a dedicated discrimination parameter field value (radio interface specific) for each message. This discrimination parameter field value will be then checked by the mobile switch 10 to thereby identify the signalling protocol and the message group (i.e. the radio interface) to which the received message belongs.

In order to facilitate understanding of the present invention, the conventional GSM specific A-interface supporting a single radio interface will be first described with reference FIGS. 2, 3 and 4. The PCS specific A-interface PN-3343 is based on the GSM specific A-interface.

Figure 2:
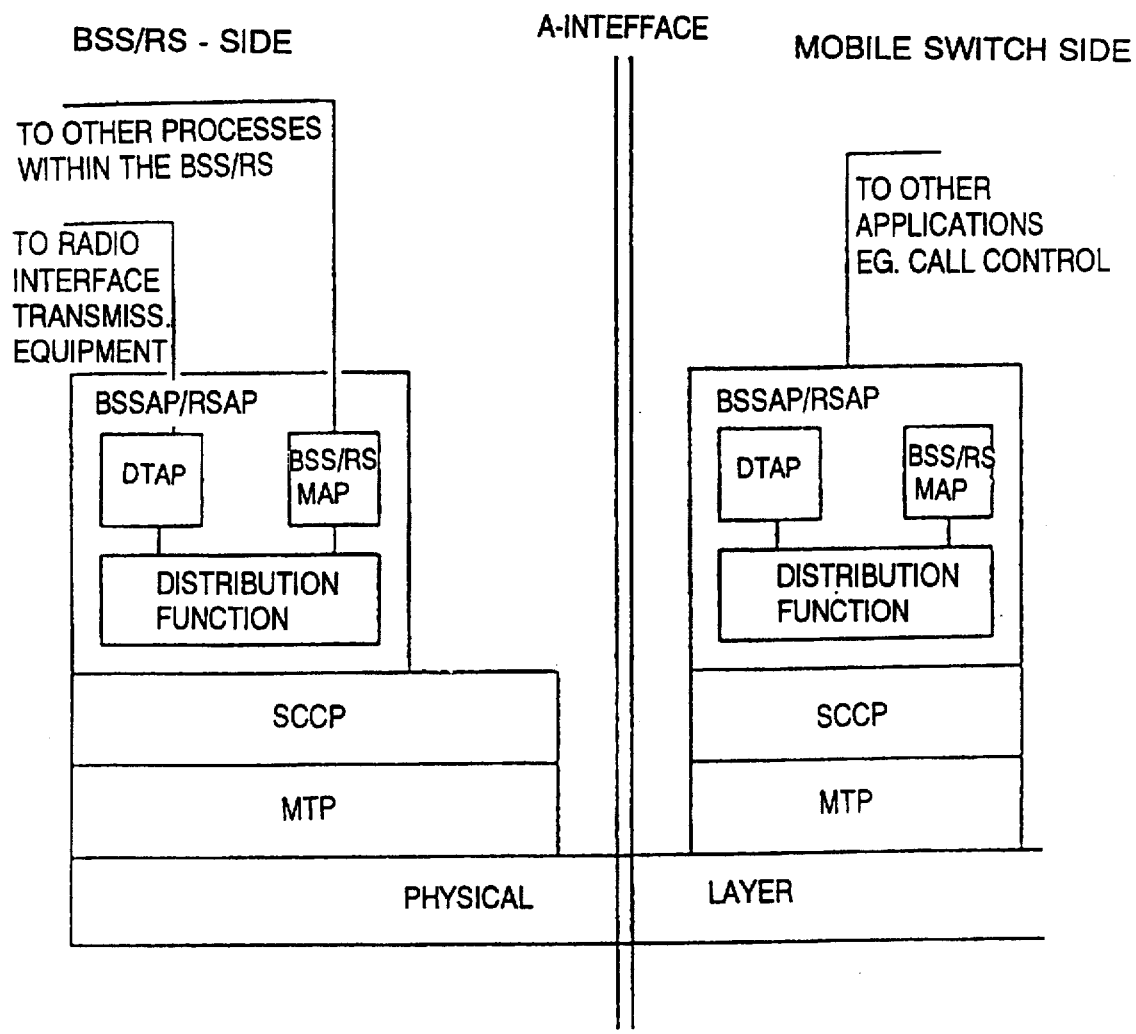
FIG. 2 depicts a signalling protocol reference model of the A-interface according to the GSM specifications.

FIG. 2 illustrates the signalling protocol reference model of A-interface between the mobile switch 10 and the base station system BSS (or Radio System RS).

The A-interface is based on ANSI/CCITT signalling system number 7 (SS7) having several layers: SCCP, MTP and physical layer. The bottom layer in FIG. 2 is the physical layer. In case of a digital link being used between the BSC and the mobile switch 10, the signalling of physical layer will be carried in one of 56 or 64 kbits/s time slots. The next upper layers in the A-interface are message transfer part (MTP) and signalling connection and control part (SCCP). The MTP and SCCP are used to support signalling messages between the mobile switch 10 and the BSS.

One user function of the SCCP, called BSS application part (BSSAP) is defined (Radio System application part in the PCS system). The BSSAP (or RSAP) uses one signalling connection per active mobile station MS having one or more active transactions, for the transfer of layer 3 messages. The BSSAP (RSAP) user function is further subdivided into two separate functions:

- the direct transfer application sub-part DTAP is used to transfer call control and mobility management messages between the mobile switch 10 and the MS. The DTAP information in these messages is not interpreted by the BSS. Technical specification GSM 08.06 contains more detail relating to the handling of DTAP messages at the BSS, the multiplexing of the messages on the relevant signalling channels of the radio interface and the use of the SCCP services. The descriptions of the layer 3 protocols for the MS-MSC information exchange are contained in the 04-series of GSM technical specifications.
- the BSS management application sub-part BSSMAP (a radio system management application part in the PCS) supports other procedures between the mobile switch 10 and the BSS related to the MS (resource management, handover control), or to a cell within the BSS (or the radio system RS), or to the whole BSS. In other words, BSSMAP (RSMAP) supports all the procedures between the mobile switch 10 and the BSS (RS) that require interpretation and processing of information related single calls, and resource management.

The discrimination between the messages related to these two sub-parts DTAP and BSSMAP (RSMAP) is performed in an intermediate layer between SCCP and layer 3. This intermediate layer is referred as the distribution sublayer or the distribution function.

DTAP and BSSMAP (RSMAP) layer 3 messages between the mobile switch 10 and the BSS (RS) are contained in the user data field of the exchanged SCCP messages. The structure of the user data field of the SCCP unit data message is shown in FIGS. 3 and 4 for carrying BSSMAP (RSMAP) and DTAP messages, respectively. As shown in FIGS. 3 and 4 the user data field contains, in both cases, a distribution data unit, a length indicator, and the actual layer 3 message. Each SCCP user data field further contains a distribution data unit as a header. In case of BSSMAP (RSMAP) messages the distribution data unit only consists of discrimination parameter, as shown FIG. 3. In case of DTAP messages the distribution unit consists of two parameters, the discrimination parameter and the data link connection indication (DLCI) parameter. The latter parameter is not essential for the present invention and will not be described more detailly.

In both cases, the discrimination parameter is coded on one octet as shown in FIG. 7. One bit of the discrimination parameter, referred as a discrimination bit D, indicates whether the layer 3 message in the SCCP user data field is a DTAP message (D=1) or BSSMAP (RSMAP) message (D=0). The discrimination bit D is normally the least significant bit. In the GSM specific discrimination parameter value the remaining bits are set zero.

The distribution data unit is used by the distribution sublayer between SCCP and layer 3 for distribution of messages between the BSSMAP (RSMAP) and DTAP functions and the distribution/multiplexing of DTAP messages to/from the various radio link layer 2 access points.

As noted before, the conventional GSM specific A-interface supports only one radio interface and signalling protocol.

According to the preferred embodiment of the present invention the GSM based A-interface, such as PCS specific A-interface, is enhanced to support two or more radio interfaces and their signalling protocols. This is achieved by utilizing the remaining bits in the discrimination parameter field DP to indicate the radio interface and the associated signalling protocol to which the layer 3 message belongs.

In order to support one radio interface, the A-interface has to include a signalling protocol which contains a number of messages, referred herein as a message group. A message group is radio interface specific. Each group comprise both DTAP and BSSMAP (RSMAP) messages to the radio interface. If the A-interface has to support only one radio interface, only one message group is required. In this case the implementation of the A-interface and the value of the discrimination parameter may be similar to the conventional A-interface.

Figure 5:
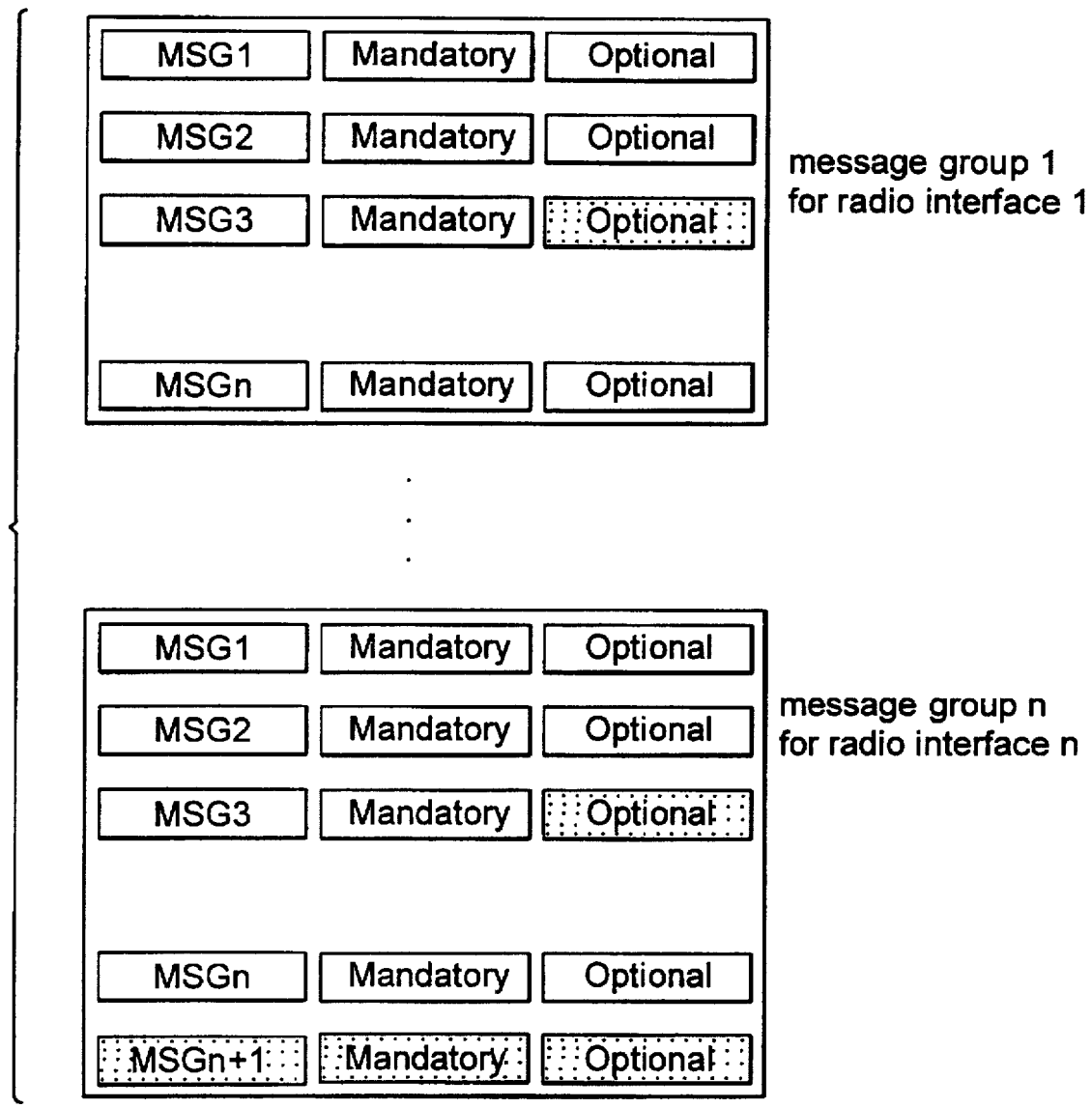
FIG. 5 illustrates multiple message groups of the A-interface supporting multiple radio interfaces.

If the mobile radio system and the A-interface support multiple radio interfaces, also several signalling protocols and thereby several message groups are required. FIG. 5 illustrates multiple message groups of the A-interface supporting multiple radio interfaces. Some messages MSG are common to all message groups. In addition to these messages, each group may include messages and information elements, mandatory or optional, that are not supported by other message groups. The essential part of the messages can be common to all air interfaces and message groups, and thus can be managed in a similar way. Signalling protocols and message groups can be easily added into and removed from the A-interface. Therefore, a single network may comprise different versions of the A-interfaces supporting different combinations of radio interfaces and their signalling protocols.

According to the invention a dedicated discrimination field value is assigned for each message group (radio interface). For example, as illustrated in FIGS. 7, 8 and 9, a discrimination field value 0000000D may be assigned for radio interface 1 messages, 1000000D for radio interface 2 messages, and 0100000D for radio interface 3 messages. In other words bits 7 and 8 of the discrimination field are utilized to identify the radio interface. Naturally, any free bits in the discrimination parameter field can be for this purpose, for example bits 2 and 3. The discrimination bit D is used in a normal manner for discrimination between DTAP (D=1) and BSSMAP/RSMAP (D=0) messages.

Figure 6:
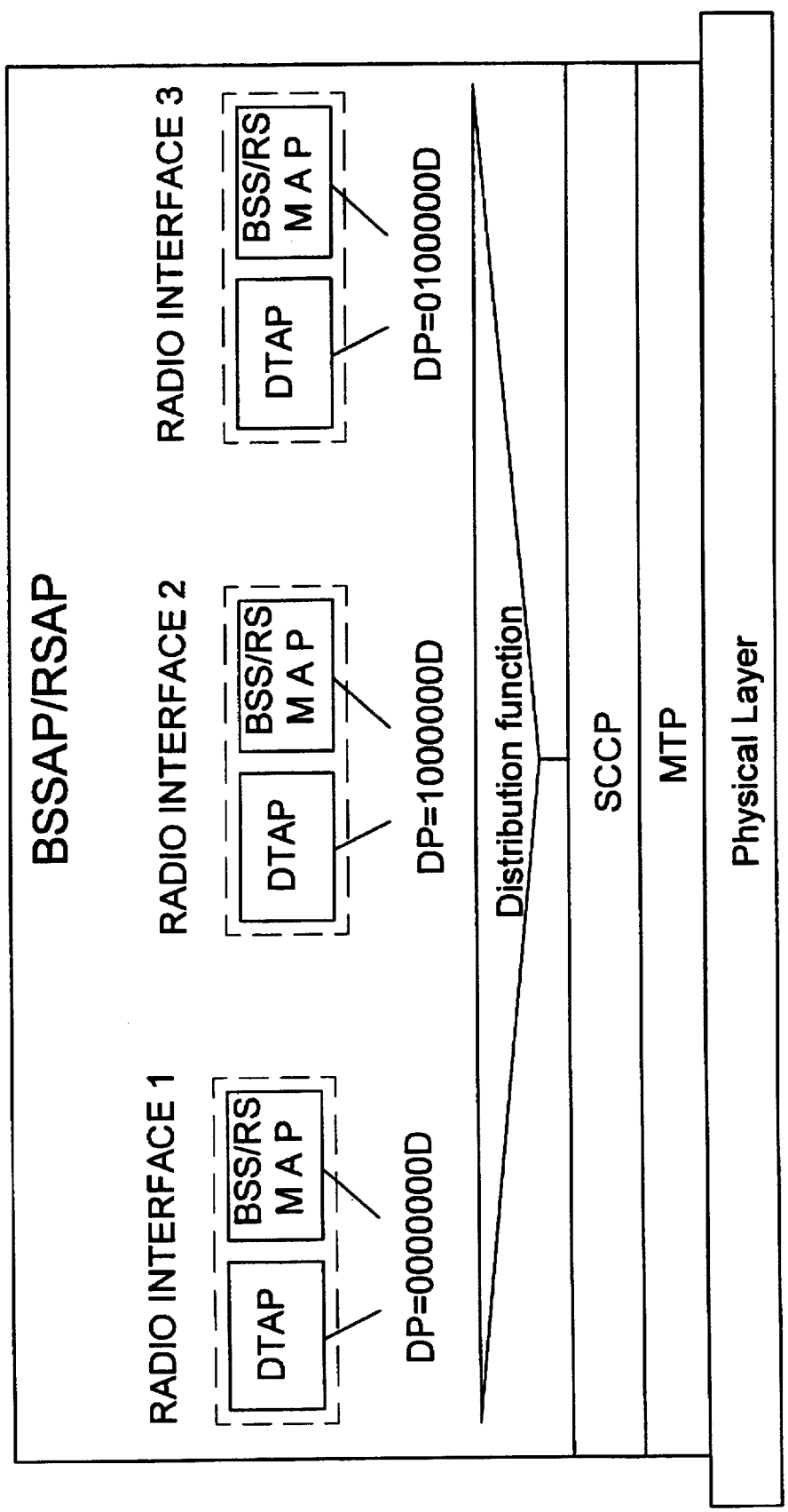
FIG. 6 depicts the signalling protocol reference models of the A-interface supporting multiple radio interfaces, according to the invention.

The structure and operation of the A-interface according to the preferred embodiment of the invention will be now described with reference to FIG. 6. FIG. 6 shows a signalling protocol reference model of the A-interface according to the present invention. The physical layer as well as the layer 2 protocol MTP and SCCP are similar to the same layers in FIG. 2 and require no modifications for the implementation of the present invention. The BSS application part BSSAP (or RSAP) supports three different radio interfaces in FIG. 6, namely radio interfaces 1, 2 and 3. In order to implement this, the BSSAP/RSAP comprises a dedicated pair of DTAP and BSSMAP functions for each radio interface. As a consequence there are three pairs of DTAP and BSSMAP/RSMAP functions in the BSSAP/RSAP in FIG. 6.

The intermediate distribution sublayer, or a distribution function, is located between the SCCP and the layer 3 functions DTAP and BSSMAP/RSMAP. The basic function of the distribution sublayer is the same as in FIG. 2: the distribution of SCCP messages between the BSSMAP and DTAP functions. The DTAP and BSSMAP/RSMAP layer 3 messages between the mobile switch 10 and the BSS are again contained in the user data field of the exchanged SCCP messages. The user data field used in the A-interface according to the invention is similar to the user data field shown FIGS. 3 and 4 for BSSMAP/RSMAP and DTAP messages, respectively. Each user data field again contains distribution data unit which includes the discrimination parameter which indicates whether the layer 3 message in the user data field is a DTAP message (the discrimination bit D=1) or a BSSMAP/RSMAP message (D=0).

However, since the A-interface supports three interfaces 1, 2 and 3, and there are a dedicated pair of DTAP and BSSMAP/RSMAP functions for each radio interface, a dedicated value of the discrimination parameter is assigned for each radio interface. More particularly, a distribution parameter value 0000000D (FIG. 7) is assigned for radio interface 1, 1000000D (FIG. 8) for radio interface 2, and 0100000D (FIG. 9) for the radio interface 3. The value of the distribution parameter is utilized to discriminate the messages between the pairs of DTAP and BSSMAP/RSMAP functions of the different radio interfaces, and the distribution bit D is utilized in a conventional manner to discriminate the messages between DTAP and BSSMAP/RSMAP functions within each pair.

Similar reference models as shown in FIG. 6 can be found at both ends of the A-interface, i.e. in the base station controller BSC and the mobile switch 10.

The operation of the A-interface according to the invention will now be described with an illustrating example in which a DTAP message belonging to the radio interface 3 is transferred from the base station controller BSC to the mobile switch 10 via the A-interface according to the invention. Firstly, a DTAP message is received from the radio interface 3 by the appropriate DTAP function, and inserted to a user data field of an SCCP message via the distribution sublayer. The distribution sublayer knows that the message in the user data field is a DTAP message from radio interface 3, and consequently, sets the discrimination parameter in the user data field to the value 01000000 (cf. FIG. 9). Then the SCCP message is transferred from the BSC to the mobile switch 10 via the A-interface. At the mobile switch 10 the distribution sublayer checks the value of the discrimination parameter field in the received SCCP message. The value 01000000 indicates that the layer 3 message is a DTAP message from radio interface 3, and the distribution sublayer delivers the message to the DTAP function of the radio interface 3. Similarly, any DTAP and BSSMAP message belonging to the message groups of radio interfaces 1, 2 and 3 can be transferred between the BSS and the mobile switch 10 in both directions, by using the appropriate discrimination parameter field value allocated to the specific message type and radio interface.

The foregoing description shows only preferred embodiments of the present invention. Various modifications are apparent to those skilled in the art without departing from the spirit and scope of the present invention defined by the appended claims.

We claim:

1. A mobile radio system, comprising
   mobile stations,
   a mobile switch,
   a base station system supporting multiple radio interfaces for communication between said base station system and said mobile stations,
   a dedicated signalling protocol associated with each of said multiple radio interfaces,
   a single signalling interface between said mobile switch and said base station system, said single signalling protocol supporting each of said dedicated signalling protocols,
   a discrimination parameter used separating signalling messages belonging to different signalling protocols from each other, said discrimination parameter being associated with each signalling message transferred through said single signalling interface for indicating the signalling the signalling protocol said message belongs to.

2. A mobile radio system, comprising
   mobile stations,
   a mobile switch,
   a base station system supporting a first radio interface for communication with a first group of said mobile stations and a second radio interface for communication with a second group of said mobile stations,
   a first signalling protocol and a first group of signalling messages associated with said first radio interface,
   a second signalling protocol and a second group of messages associated with said second radio interface,
   a single signalling interface between said mobile switch and said base station system, said single signalling protocol supporting each of said dedicated signalling protocols,
   a discrimination parameter used for separating said first and second groups of signalling messages belonging to different signalling protocols from each other, said discrimination parameter being associated with each signalling message transferred through said single signalling interface for indicating the signalling the signalling protocol said message belongs to.

3. A mobile radio system, comprising
   mobile stations,
   a mobile switch,
   a base station system supporting a first radio interface for communication with a first group of said mobile stations and radio interface for communication with a second group of said mobile stations,
   a single signalling interface between said mobile switch and said base station system, said single signalling interface comprising
      an upper signalling layer comprising a first group of signalling messages corresponding to said first radio interface for signalling between said mobile switch and said base station system over said single signalling interface, and a second group of signalling messages corresponding to said second radio interface for signalling between said mobile switch and said base station system over said single signalling interface,
      a lower signalling layer for carrying said upper signalling layer messages in an user data field of a lower layer message over said single signalling interface,
      said user data field of said lower layer message further containing a discrimination parameter, one or more bits of said discriminating parameter indicating whether said message in said user data field of said lower layer message belongs to said first group of messages or to said second group of messages,
      an intermediate layer between said lower layer and said upper layer for managing said discrimination parameter and for discrimination between said upper layer messages belonging to said first and second groups of messages.

4. A mobile radio system, comprising
   mobile stations,
   a mobile switch,
   a base station system supporting a first radio interface for communication with a first group of said mobile stations and a second a second radio interface for communication with a second group of said mobile stations,
   a single signalling interface between said mobile switch and said base station system,
   a first group of signalling messages corresponding to said first radio interface for signalling between said mobile switch and said base station system over said single signalling interface,
   a second group of signalling messages corresponding to said second radio interface for signalling between said mobile switch and said second base station system over said single signalling interface,
   said single signalling interface comprising
      a first direct transfer application sub-part DTAP for transferring DTAP messages in said first group of messages between said mobile switch and said first group of said mobile stations via said single signalling interface and base station system,
      a first base station system management application sub-part BSSMAP for transferring BSSMAP messages in said first group messages between said mobile switch and said base station system,
      a second direct transfer application sub-part DTAP for transferring DTAP messages in said second group of messages between said mobile switch and said second group of said mobile stations via said single signalling interface and base station system,
      a second base station system management application sub-part BSSMAP for transferring BSSMAP messages in said second group messages between said mobile switch and said base station system,
      a single signalling connection and control part SCCP for transferring said DTAP and BSSMAP messages in an user data field of a SCCP message over said single signalling interface, said user data field of said SCCP message containing a distribution data unit, a length indicator and said DTAP or BSSMAP message to be transferred, said distribution data unit containing a discrimination parameter, at least one bit of said discrimination parameter indicating whether the message in said user data field of said SCCP message is a BSSMAP message or a DTAP message, and one or more of the remaining bits of said discriminating parameter indicating whether said message in said user data field of said SCCP message belongs to said first group of messages or said second group of messages, an intermediate layer between the SCCP and DTAP and BSSMAP and for managing said discrimination parameter and for discrimination between said DTAP and BSSMAP messages belonging to said first and second groups of messages.

5. A mobile radio system according to claim 4, wherein said intermediate layer is responsive to said discrimination parameter in a received SCCP message to distribute the message in the user data field of the SCCP message to said first DTAP if said discrimination parameter indicates the message in said user data field is a DTAP message belonging to said first group of messages, said second DTAP if said discrimination parameter indicates the message in said user data field is a DTAP message belonging to said second group of messages, said first BSSMAP if said discrimination parameter indicates the message in said user data field is a BSSMAP message belonging to said first group of messages, said second BSSMAP if said discrimination parameter indicates the message in said user data field is a BSSMAP message belonging to said second group of messages.

6. A mobile radio system according to claim 4, wherein said single signalling interface is substantially similar to the GSM specific A-interface.

7. A mobile radio system, comprising personal stations, a mobile switch, a radio system supporting a first radio interface for communication with a first group of said personal stations and a second interface for communication with a second group of said personal stations, a single signalling interface between said mobile switch and said radio system, a first group of signalling messages corresponding to said first radio interface for signalling between said mobile switch and said radio system over said single signalling interface, a second group of signalling messages corresponding to said second radio interface for signalling between said mobile switch and said radio system over said single signalling interface, said single signalling interface comprising a first direct transfer application sub-part DTAP for transferring DTAP messages in said first group of messages between said mobile switch and said first group of said personal stations via said single signalling interface and said radio system, a first radio system management application sub-part RSMAP for transferring RSMAP messages in said first group messages between said mobile switch and said radio system, a second direct transfer application sub-part DTAP for transferring DTAP messages in said second group of messages between said mobile switch and said second group of said personal stations via said single signalling interface and said radio system, a second radio system management application sub-part RSMAP for transferring RSMAP messages in said second group messages between said mobile switch and said radio system, a single signalling connection and control part SCCP for transferring said DTAP and BSSMAP messages in an user data field of a SCCP message over said single signalling interface, said user data field of said SCCP message containing a distribution data unit, a length indicator and said DTAP or RSMAP message to be transferred, said distribution data unit containing a discrimination parameter, at least one bit of said discrimination parameter indicating whether the message in said user data field of said SCCP message is a RSMAP message or a DTAP message, and one or more of the remaining bits of said discriminating parameter indicating whether said message in said user data field of said SCCP message belongs to said first group of messages or said second group of messages, an intermediate layer between the SCCP and DTAP and RSMAP and for managing said discrimination parameter and for discrimination between said DTAP and RSMAP messages belonging to said first and second groups of messages.

8. A mobile radio system according to claim 7, wherein said intermediate layer is responsive to said discrimination parameter in a received SCCP message to distribute the message in the user data field of the SCCP message to said first DTAP if said discrimination parameter indicates the message in said user data field is a DTAP message belonging to said first group of messages, said second DTAP if said discrimination parameter indicates the message in said user data field is a DTAP message belonging to said second group of messages, said first RSMAP if said discrimination parameter indicates the message in said user data field is a RSMAP message belonging to said first group of messages, said second RSMAP if said discrimination parameter indicates the message in said user data field is a RSMAP message belonging to said second group of messages.

9. A mobile radio system according to claim 7, wherein said single signalling interface is a signalling system Number 7 (SS7) based A-interface PN-3343.

10. A signalling method in a mobile radio system, comprising steps of utilizing at least two different radio interfaces for communication between a base station system and a plurality of mobile stations, utilizing a dedicated signalling protocol for each of said at least two different radio interfaces, utilizing a single signalling interface for signalling between said base station system and a mobile switch, said single signalling interface supporting each of said dedicated signalling protocols, associating a discrimination parameter with each signalling message transferred through said single signalling interface, for separating signalling messages belonging to different signalling protocols from each other in said single signalling interface, a dedicated value of said discrimination parameter being allocated to each of said radio multiple radio interfaces.

11. A mobile radio system, comprising personal stations, a mobile switch, a radio system supporting a first radio interface for communication with a first group of said personal stations and a second interface for communication with a second group of said personal stations, a single signalling interface between said mobile switch and said radio system, a first group of signalling messages corresponding to said first radio interface for signalling between said mobile switch and said radio system over said single signalling interface, a second group of signalling messages corresponding to said second radio interface for signalling between said mobile switch and said radio system over said single signalling interface, said single signalling interface comprising

- a first direct transfer application sub-part DTAP for transferring DTAP messages in said first group of messages via said single signalling interface and said radio system,
- a first radio system management application sub-part RSMAP for transferring RSMAP messages in said first group messages between said mobile switch and said radio system,
- a second direct transfer application sub-part DTAP for transferring DTAP messages in said second group of messages between said mobile switch and said second group of said personal stations via said single signalling interface and said radio system,
- a second radio system management application sub-part RSMAP for transferring RSMAP messages in said second group messages between said mobile switch and said radio system,
- a single signalling connection and control part SCCP for transferring said DTAP and BSSMAP messages in an user data field of a SCCP message over said single signalling interface, said user data field of said SCCP message containing a distribution data unit, a length indicator and said DTAP or RSMAP message to be transferred, said distribution data unit containing a discrimination parameter, at least one bit of said discrimination parameter indicating whether the message in said user data field of said SCCP message is a RSMAP message or a DTAP message, and one or more of the remaining bits of said discriminating parameter indicating whether said message in said user data field of said SCCP message belongs to said first group of messages or said second group of messages, an intermediate layer between the SCCP and DTAP and RSMAP and for managing said discrimination parameter and for discrimination between said DTAP and RSMAP messages belonging to said first and second groups of messages.

* * * * *